United States Patent [19]

Hoshizaki et al.

[11] Patent Number: 4,711,990
[45] Date of Patent: Dec. 8, 1987

[54] CERAMIC HEATER

[75] Inventors: Hiroki Hoshizaki; Nobuaki Kawahara, both of Anjo; Hirofumi Suzuki, Kariya; Kazuo Oyobe, Ohbu, all of Japan

[73] Assignee: Nippondenso Co., Ltd., Kariya, Japan

[21] Appl. No.: 816,868

[22] Filed: Jan. 7, 1986

[30] Foreign Application Priority Data

Jan. 11, 1985 [JP] Japan .................................. 60-3459

[51] Int. Cl.⁴ ........................... H05B 3/10; H01B 1/06
[52] U.S. Cl. ..................................... 219/552; 219/553; 338/330
[58] Field of Search ............... 219/552, 553, 374, 375, 219/381, 382, 205–208, 270; 338/333, 330, 53; 123/558, 550, 543, 145 A, 145 R, 142.5 R, 142.5 E

[56] References Cited

U.S. PATENT DOCUMENTS

| 3,269,806 | 8/1966 | Fitzer et al. ..................... 338/330 X |
| 3,681,737 | 8/1972 | Magnusson et al. ................. 338/262 |
| 4,475,029 | 10/1984 | Yoshida et al. ................. 219/270 |
| 4,555,358 | 11/1985 | Matsushita et al. ............ 219/553 X |

FOREIGN PATENT DOCUMENTS

| A2095720 | 12/1983 | European Pat. Off. . |
| A1107511 | 5/1984 | European Pat. Off. . |
| 114326 | 9/1929 | Fed. Rep. of Germany ...... 123/549 |
| 963040 | 6/1950 | France .............................. 123/145 A |
| 2515914 | 5/1983 | France . |
| 861864 | 9/1981 | U.S.S.R. ........................ 123/145 A |

Primary Examiner—Clifford C. Shaw
Assistant Examiner—C. Sigda
Attorney, Agent, or Firm—Cushman, Darby & Cushman

[57] ABSTRACT

The ceramic heater of the present invention is used for regenerating a fine particle collecting filter which is exposed to exhaust gases at elevated temperatures. In this ceramic heater, which is capable of being cantilevered, two electrode portions are provided on a single straight or curved line and heat generating portion is positioned on one side of said line. The heat generating portion comprises a ring-like portion and two leg portions integrally connected to the ring-like portion at two connecting portions which approximately bisect the ring-like portion. The two electrode portions are provided at fore ends of the leg portions respectively, and the ring-like portion and the two electrode portions conjointly form a triangle.

8 Claims, 7 Drawing Figures

CERAMIC HEATER

BACKGROUND OF THE INVENTION

The present invention relates to an improvement of a ceramic heater and particularly it is applied to a heater for the regeneration of an apparatus for collecting and purifying fine particles contained in the exhaust gas of a diesel engine or the like.

For collecting and purifying fine particles contained in the exhaust gas, it has been proposed to use a heat-resistant honeycomb- or foam-like filter made of a ceramic material and fire and burn the collected fine particles by means of a heat-resistant ceramic heater disposed on an upper surface of the said filter to regenerate the latter. In this case, from the standpoint of easiness of handling of electrodes, prevention of heater breakage, protection of electrode portions and unification of the heater shape, it has been considered desirable to dispose a plurality of plate-like heaters formed in the shape of U or V.

Usually, a U- or V-shaped heater is connected at its both end electrode portions 35 to metallic lead wires for example as shown in FIG. 7 and is thereby charged electrically and heated, so with a view to protecting the electrode portions the sectional area of the electrode portions is made fairly larger than that of a heat generating portion to suppress the heat generation at the electrode portions.

However, in a conventional ceramic heater there arises an opening/closing motion of the leg portions in the course of heat generation and cooling due to thermal expansion, and once the heater is fixed to a holding portion, the above motion is impeded by friction, for example, and stress is concentrated on a bent portion 25a. This stress concentration of the bent portion 25a is proportional to a moment of an external force exerted on the leg portion and a length (Lo) from the leg portion to the bent portion 25a. Consequently, this shape causes the problem that stress is concentrated on the bent portion 25a and a repeated supply of electricity results in crack of the bent portion.

The above conventional ceramic heater also involves the problem that when it is disposed on the filter surface, it is impossible to heat the filter surface widely because the area of heat generation is small in comparison with the large space of the electrode portions.

SUMMARY OF THE INVENTION

The present invention overcomes the abovementioned drawbacks and it is the object thereof to provide a ceramic heater capable of preventing stress concentration during heat generation of the heater, ensuring a uniform heating property, also ensuring a large heat generating area and facilitating the handling of electrodes.

The ceramic heater of the present invention is a cantileverable ceramic heater in which two electrode portions are provided on a single straight or curved line and a heat generating portion is positioned on one side of the line.

The above heat generating portion comprises a closed loop portion and two leg portions integrally connected to the closed loop portion at two connecting portions which approximately bisect the closed loop portion. The two electrode portions are each provided at fore ends of the two leg portions respectively.

This ceramic heater is characterized by having a construction in which the closed loop portion and the two electrode portions conjointly form a triangle.

In this ceramic heater, the two electrode portions may be opposing to each other and the closed loop portion may be disposed above a line between the two electrode portions.

BRIEF DESCRIPTION OF THE DRAWINGS

The exact nature of this invention, as well as other objects and advantages thereof, will be readily apparent from consideration of the following specification relating to the annexed drawings in which.

DETAILED DESCRIPTION OF THE INVENTION

Figure 1:
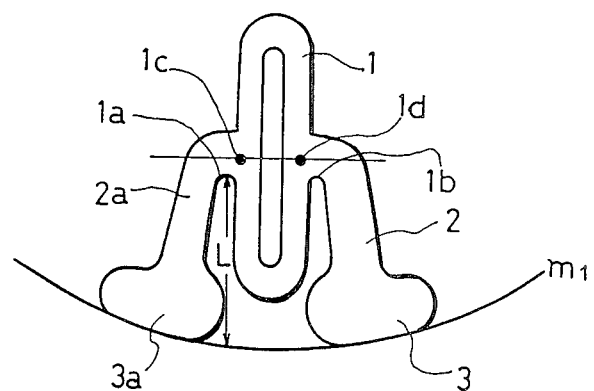
FIG.1 is a plan view of a ceramic heater embodying the invention.

The ceramic heater of the present invention is, for example, as shown in FIG. 1 in which two electrode portions 3 and 3a are provided on a single straight or curved line $m_1$ and a heat generating portion is positioned on one side of the line $m_1$. The heat generating portion comprises a ring-like portion 1 and two leg portions 2 and 2a which are integrally connected to the ring-like portion 1 at two connecting portions 1c and 1d which approximately bisect the ring-like portion 1. The electrode portions 3 and 3a are provided at fore ends of the leg portions 2 and 2a, respectively. This ring-like portion 1 and the two electrode portions 3, 3a constitute a triangle.

Figure 2:
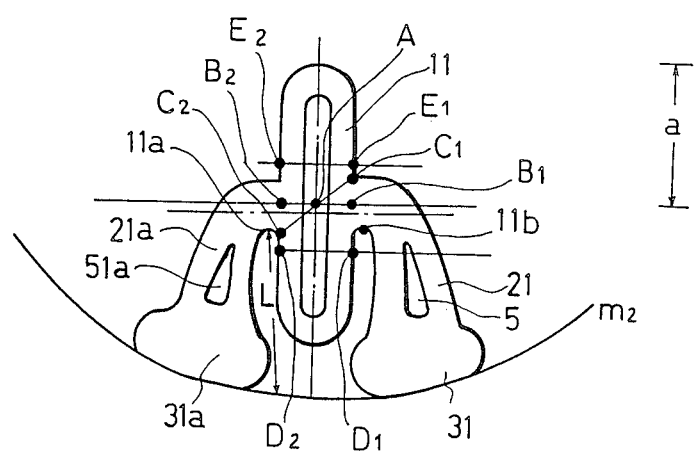
FIG. 2 is a plan view of a ceramic heater according to Embodiment 1.
Figure 3:
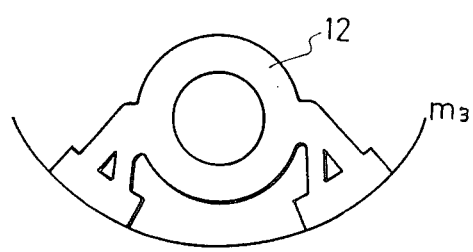
FIG. 3 is a plan view of a ceramic heater having a ring-like portion of a true roundness.
Figure 4:
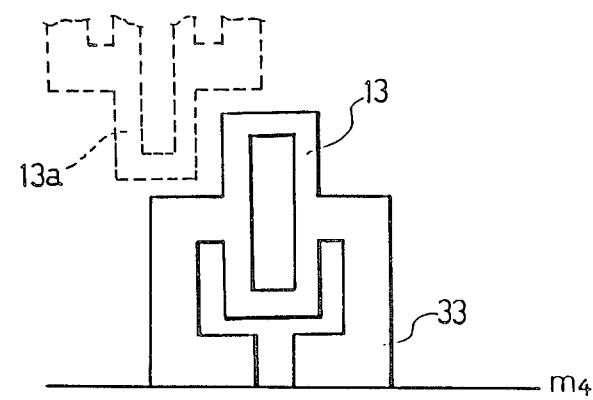
FIG. 4 is a plan view of a ceramic heater having a rectangular ring-like portion.

The electrode portions of the ceramic heater of the present invention are for supplying an electric current to the ceramic heater to allow the heater to generate heat. They are provided, for example, on a single curved line $m_1$ or $m_3$ as shown in FIG. 1 or FIG. 3, or on a single straight line $m_4$ as shown in FIG. 4, and at fore ends of the leg portions 2 and 2a as shown in FIG. 1. The electrode portions, in plan view, may be larger than the leg portions and have convexes in the line directions, as shown in FIGS. 1 and 2. The convexes may be disposed outside as shown in FIG. 1 or may be disposed inside as shown at 33 in FIG. 4. In the latter case, a larger heat generation area can be ensured when plural ceramic heaters are combined.

In the ceramic heater of the present invention, the heat generating portion is positioned on one side of the above line and it comprises the ringlike portion 1 and the two leg portion 2 and 2a integrally connected to the ring-like portion 1 at the two connecting portions which approximately bisect the ring-like portion 1, for example as shown in FIG. 1.

The ring-like portion may be positioned nearly centrally of the ceramic heater to constitute a main heat generating portion. As to the shape of the ring-like portion, its plane shape, whether long and short diameters are present or not, the ratio of long to short diameter, the ring width and the like are not specially limited. For example, the ring-like portion may be in the shape of a track-like ellipse as shown in FIGS. 1 and 2, a true round 12 as shown in FIG. 3, or a rectangle 13 as shown in FIG. 4.

The two leg portions are integrally connected to the ring-like portion at the two connecting portions which approximately bisect the ring-like portion. The expression "approximately bisect" means that, as shown in FIG. 2, in order to ensure a uniform heating property, the two connecting points may be $B_1$ and $B_2$, or $C_1$ and $C_2$, which bisect the ring-like portion 11 by a straight line which passes through a center A of the ring-like portion 11 and that the connecting points are within a vertical range corresponding to one third of a long radius "a" from the points $B_1$ and $B_2$, that is, the left-hand connecting point is within the range of between $D_2$ and $E_2$, while the right-hand connecting point is within the range of between $D_1$ and $E_1$. The connecting portions are preferably connected on a short diameter side in the case of a ring having short and long diameters.

The leg portions, which connect the ring-like portion with the two electrode portions, can constitute a sub heat generating portion. They may have about the same width as shown in FIG. 1 or may be divergent toward their fore ends and have slits 5 formed in a direction parallel to the extending direction of the leg portions 21 as shown in FIG. 2. The number and shape of the slits are not specially limited, but preferably the slits are formed in a direction parallel to the extending direction of the leg portions so that the leg portions are each almost constant in cross sectional area, as shown in FIG. 2.

In fixing the heater, usually the electrode portions are fixed to a case.

In this ceramic heater, a triangle is formed by the ring-like portion and the two electrode portions. This makes a cantilevered state of the ceramic heater possible and also makes it possible to combine a plurality of the ceramic heaters to enlarge the heater surface area.

As an entire shape, the ceramic heater may take various triangular shapes. For example, as shown in FIGS. 1 and 2, the ceramic heater is preferably in the shape of an isosceles triangle whose base is a line joining the electrode portions. This is because where a plurality of ceramic heaters are combined in a circular shape, the entire area of the circle can be covered equally. Plural ceramic heaters may be combined in such a fashion as shown in FIG. 4 in which each ceramic heater is of a square or rectangular shape having a projecting top part and a plurality of such ceramic heaters 13, 13a are combined in a parallel direction oppposedly to each other.

The electrode portions may each include a metallized layer integrally formed on the surface of a fore end of each leg portion. The material of the metallized layer is not specially limited; it may be a material usually employed. Preferably, the metallized layer is so formed as to cover almost the entire surface of each electrode portion. Further, on the surface side of the metallized layer 6 there may be disposed a metal electrode 8 as shwon in FIG. 5. The metal electrode may be of a shape which presses an end portion of the ceramic heater as shown in FIG. 5, or it may be an electrode plate with a lead wire bonded thereto.

Figure 5:
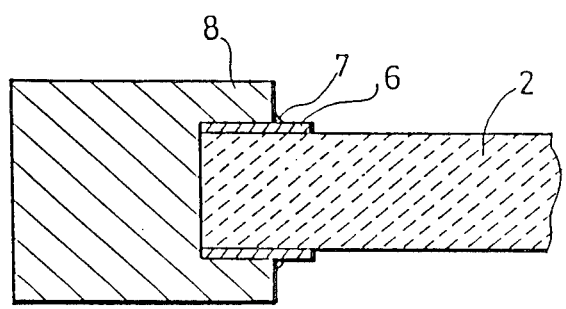
FIG. 5 is a partially sectional view of a ceramic heater having a metallized layer on the surface thereof and a metal electrode disposed on the surface of the metallized layer.

There may be formed a solder material layer 7 to bond the metallized layer 6 and the metal electrode 8 together as shown in FIG. 5. Although the material of the solder material layer is not specially limited, there usually is employed copper or the like having heat resistance.

The ceramic heater can be fabricated by mixing a powder of a conductive ceramic (e.g. titanium nitride) and an insulating material powder (e.g. silicon nitride) which constitutes the heating element, then forming the resulting powdery mixture into a predetermined shape and calcining the thus-shaped ceramic body to obtain a sintered ceramic product as the ceramic heater.

As set forth above, the ceramic heater of the present invention has a ring-like or closed loop portion as a main heat generating portion and two leg portions integrally connected to the ring-like portion at two connections which approximately bisect the ring-like portion. Thus there are bisected bent portions unlike the conventional V- or U-shaped ceramic heater; besides, the distance (L) from an end of each electrode portion to each bent portion 1a and 1b, for example in FIG. 1 is shorter in the ceramic heater of the invention than in the conventional ceramic heater. Consequently, the stress imposed on the bent portions becomes smaller than in the conventional heater and the stress concentration during heat generation of the heater can be avoided, that is, the heater has an extremely high breaking strength.

Figure 6:
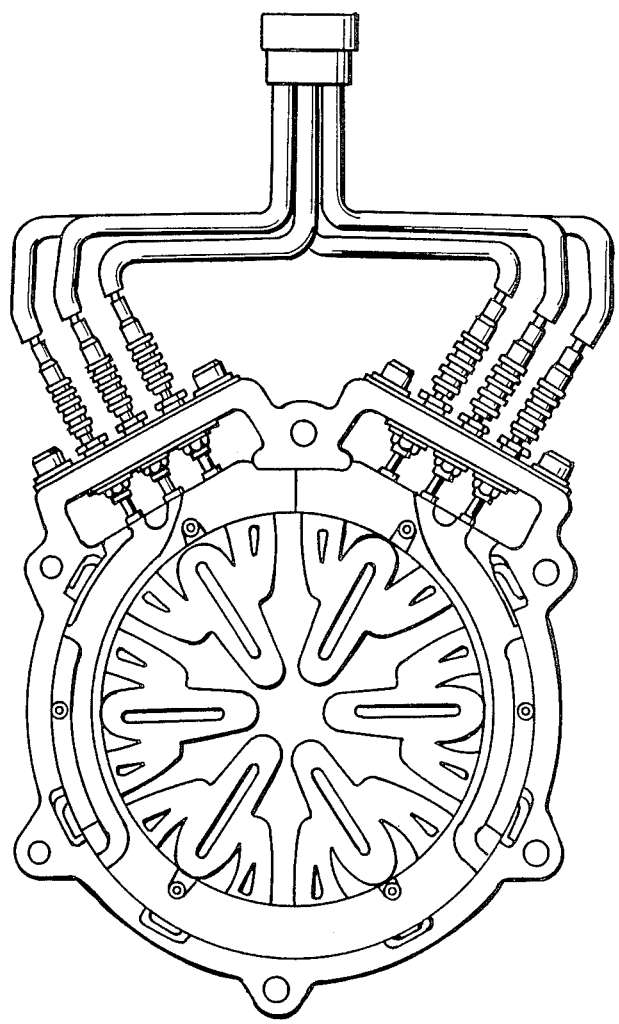
FIG. 6 is a plan view of a heating apparatus constituted by the combination of six ceramic heaters.

Further, that two electrode portions are disposed on a single straight or curved line is very convenient for maintaining a cantilevered condition. Therefore, if a plurality (e.g. six) of these ceramic heaters are combined, for example, as shown in FIG. 6, this combination can be utilized efficiently as a heater to regenerate an apparatus for collecting and purifying fine particles contained in the exhaust gas of a diesel engine or the like.

The ceramic heater of the present invention can be formed as a whole generally in the shape of an isosceles triangle whose base is a line joining the two electrode portions. In this case, the heat generating area of the ceramic heater can be enlarged by disposing a plurality of such heaters on a circumference.

Thus, the ceramic heater of the present invention facilitates handling of the electrodes, is superior in uniform heating property and permits a larger heat generation area. Besides, it is possible to prevent a stress concentration during heat generation of the heater, that is, the heater has a high breaking strength.

DETAILED DESCRIPTION OF AN EMBODIMENT

The following embodiment is given to further illustrate the present invention.

A ceramic heater according to this embodiment is as shown in FIG. 2, in which two electrode portions 31 and 31a are provided on a single curved line $m_2$ and a heat generating portion connected to the electrode portions 31 and 31a is positioned on one side of the line $m_2$, the heat generating portion comprises a ring-like portion 11 and two leg portions 21 and 21a integrally connected to the ring-like portion 11 at two connecting portions $B_1$ and $B_2$ which bisect the ring-like portion 11. The ring-like portion 11 is in the shape of a track-like ellipse having a short to long diameter ratio of 2:9, and the two connecting portions $B_1$ and $B_2$ are positioned on a line of the short diameter.

The two leg portions 21 and 21a are divergent toward their fore ends and are formed with triangular slits 5 and 51a respectively which are formed in a direction parallel to the extending direction of the leg portions. The ceramic heater as a whole is in the shape of an isosceles triangle having a vertical angle of about 60° and an isosceles length of 70 mm. In this case, the distance (L) from the fore ends of the electrode portions 31 and 31a to base ends 11a and 11b of the bent portions is 30 mm. The ceramic heater comprises 35 wt. % of titanium nitride and 65 wt. % of silicon nitride.

This ceramic heater was fabricated by mixing 35 wt. % of titanium nitride having an average particle size of 1 μm with 65 wt. % of silicon nitride having an average particle size of 0.8 μm according to a wet process, drying the resulting mixture in a dryer together with a small amount of polyvinyl alcohol as a binder to obtain a molding powder, then pressing the powder in a heater shape by means of a mold press, followed by calcining in a nitrogen atmosphere at 1,800° C. for 2 hours, and baking a nickel paste to terminal portions of the resulting ceramic heater in a hydrogen atmosphere at 1,200° C. for 1 hour.

Figure 7:
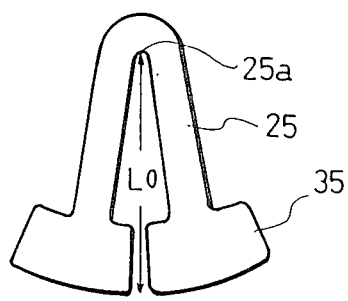
FIG. 7 is a plan view of a conventional V-shaped ceramic heater.

In FIG. 7, there is illustrated a Prior Art type ceramic heater as a comparative example, which has a V-shaped leg portion 25 and electrode portions 25 connected to the leg portion 25. The electrode portions 35 are wide and the distance (Lo) from a fore end of each electrode portion 35 to a bent portion is 45 mm. This V-shaped ceramic heater was fabricated in the same way as in the above manufacture of the ceramic heater of the present invention.

The ceramic heater of this embodiment of the invention and the above comparative ceramic heater were compared for strength by pulling the respective two electrode portions outwards. As a result, the former was broken at the bent portion 11a under a load of 12.5 kg, while the latter comparative ceramic heater was broken at the bent portion 25a under a load of 5.5 kg. From these results it is seen that the ceramic heater of this embodiment of the invention is improved in breaking strength as compared with the conventional V-shaped ceramic heater.

In the ceramic heater of this embodiment, moreover, the ring-like portion and the leg portions are about the same in cross sectional area, so this ceramic heater is extremely superior in uniform heating property. Besides, since the electrode portions are disposed on a single straight or curved line, it is easy to attain a cantilevered condition, and the elctrode portions are superior in strength because of their large width. Additionally, since this ceramic heater as a whole is in the shape of an isosceles triangle having a vertical angle of 60°, the heat generation area can be enlarged by combining six such heaters circularly as shown in FIG. 6.

What is claimed is:

1. A ceramic heater capable of being cantilevered comprising:

heat generating means having a closed loop portion and two leg portions integrally connected to said closed loop portion at two connecting portions which approximately bisect the closed loop portion;

two electrode portions being provided at fore ends of said two leg portions respectively and being disposed in the same plane constituted by said closed loop portion;

said closed loop portion and said two electrode portions conjointly forming a triangle.

2. A ceramic heater according to claim 1, wherein said two electrode portions are opposing to each other and said closed loop portion is disposed above a line between said two electrode portions.

3. A ceramic heater according to claim 2, wherein said closed loop portion is in the form of a track-like ellipse and said two connecting portions are positioned on a short radius line.

4. A ceramic heater according to claim 2, wherein said closed loop portion is in the form of a true round.

5. A ceramic heater according to claim 2, which is as a whole in the form of an isosceles triangle whose base is a line joining said electrode portions.

6. A ceramic heater according to claim 3, wherein said leg portions are divergent toward their fore ends and are formed with slits in parallel with an extending direction of said leg portions.

7. A ceramic heater according to claim 2, which is constituted by an electrically conductive ceramic comprising 35 wt. % titanium nitride and 65 wt. % silicon nitride.

8. A ceramic heater according to claim 2, wherein said electrode portions are each constituted by a metallized layer integrally formed on a surface of a fore end of each said leg portion.

* * * * *